(12) United States Patent
Fukuzono et al.

(10) Patent No.: US 11,265,056 B2
(45) Date of Patent: Mar. 1, 2022

(54) RADIO COMMUNICATION SYSTEM, COMMUNICATION METHOD, AND TRANSMITTING STATION DEVICE

(71) Applicant: NIPPON TELEGRAPH AND TELEPHONE CORPORATION, Tokyo (JP)

(72) Inventors: Hayato Fukuzono, Musashino (JP); Keita Kuriyama, Musashino (JP); Toshio Ito, Musashino (JP); Shuta Ueno, Musashino (JP); Masafumi Yoshioka, Musashino (JP); Tsutomu Tatsuta, Musashino (JP); Hiroyuki Nakamura, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/261,148

(22) PCT Filed: Jul. 23, 2019

(86) PCT No.: PCT/JP2019/028795
§ 371 (c)(1),
(2) Date: Jan. 18, 2021

(87) PCT Pub. No.: WO2020/026890
PCT Pub. Date: Feb. 6, 2020

(65) Prior Publication Data
US 2021/0273705 A1 Sep. 2, 2021

(30) Foreign Application Priority Data
Jul. 31, 2018 (JP) .............................. JP2018-143298

(51) Int. Cl.
*H04L 1/02* (2006.01)
*H04B 7/06* (2006.01)
*H04B 7/0452* (2017.01)

(52) U.S. Cl.
CPC ......... *H04B 7/0619* (2013.01); *H04B 7/0452* (2013.01)

(58) Field of Classification Search
CPC ......... H04L 1/0618; H04L 1/06; H04L 27/26; H04B 7/0417; H04B 7/0456; H04B 7/0452; H04W 72/04; H04W 16/28
(Continued)

(56) References Cited

U.S. PATENT DOCUMENTS

| 2017/0245277 A1* | 8/2017 | Yokomakura | H04W 72/0446 |
| 2020/0021352 A1* | 1/2020 | Miyazaki | H04B 7/0857 |
| 2020/0052745 A1* | 2/2020 | Yoshioka | H04B 7/024 |

OTHER PUBLICATIONS

Shohei Yoshioka et al., Single-carrier multi-user MIMO downlink with time-domain Tomlinson-harashima precoding, IEICE Trans. Commun., 2016, vol. E99-B.

* cited by examiner

*Primary Examiner* — Khai Tran (57) ABSTRACT

A radio communication system includes a transmitting station, and at least one receiving apparatus. The transmitting station includes a plurality of modulation units configured to modulate a plurality of input data to generate first data signals in units of blocks having a predetermined data length, a subtraction unit configured to calculate, by using information acquired in advance and indicating a communication path response between the transmitting station and the receiving apparatus, information indicating directivity upon transmission of the first data signals of each of the plurality of modulation units, and predetermined information included in an additional signal to be added to a data (Continued)

signal, a delay wave component of the additional signal and subtract the delay wave component calculated, from each of the first data signals of the plurality of modulation units, to generate a plurality of second data signals, a beam forming unit configured to adjust, by using the information indicating directivity, power and a phase upon transmission of each of the plurality of second data signals to generate a plurality of third data signals, a plurality of adding units configured to add the additional signal to each of the plurality of third data signals to generate a plurality of fourth data signals, and a plurality of communication units configured to transmit the plurality of fourth data signals to the receiving apparatus.

7 Claims, 3 Drawing Sheets (58) Field of Classification Search
USPC .......................................... 375/267, 260, 262
See application file for complete search history.

RADIO COMMUNICATION SYSTEM, COMMUNICATION METHOD, AND TRANSMITTING STATION DEVICE

CROSS-REFERENCE TO RELATED APPLICATIONS

This application is a 371 U.S. National Phase of International Application No. PCT/JP2019/028795, filed on Jul. 23, 2019, which claims priority to Japanese Application No. 2018-143298 filed on Jul. 31, 2018. The entire disclosures of the above applications are incorporated herein by reference.

TECHNICAL FIELD

The present disclosure relates to a radio communication system, a communication method, and a transmitting station apparatus.

BACKGROUND ART

Due to diversification of radio communication services, the number of mobile communication terminals such as smartphones, base stations, and the like that perform radio communication increase, and the amount of data transmitted increases. To transmit a large amount of data, for example, techniques for radio communication systems using single carrier block multi-user Multiple-Input and Multiple-Output (MIMO) transmissions have been proposed (see NPL 1).

CITATION LIST

Non Patent Literature

NPL 1: S. Yoshioka, S. Kumagai, and F. Adachi, "Single-carrier multi-user MIMO downlink with time-domain Tomlinson-harashima precoding," IEICE Trans. Commun., vol. E99-B, February 2016.

SUMMARY OF THE INVENTION

Technical Problem

In a known single carrier block multi-user MIMO transmission, to avoid inter-block interference, data with a predetermined symbol length taken from the end of the data included in each block is added as a Cyclic Prefix (CP) at the head of each block. Thus, in the single carrier block multi-user MIMO transmission, an 1-block long delay occurs due to processing of adding a CP to the head of the block.

An object of the present disclosure is to provide a radio communication system, a communication method, and a transmitting station apparatus that can avoid delays in processing in the single carrier block multi-user MIMO transmission.

Means for Solving the Problem

A first aspect is a radio communication system including a transmitting station and at least one receiving apparatus, and the transmitting station includes a plurality of modulation units configured to modulate a plurality of input data to generate first data signals in units of blocks having a predetermined data length, a subtraction unit configured to calculate, by using information acquired in advance and indicating a communication path response between the transmitting station and the receiving apparatus, information indicating directivity upon transmission of the first data signals generated by each of the plurality of modulation units, and predetermined information included in an additional signal to be added to a data signal, a delay wave component of the additional signal and subtract the delay wave component calculated, from each of the first data signals of the plurality of modulation units, to generate a plurality of second data signals, a beam forming unit configured to adjust, by using the information indicating directivity, power and a phase upon transmission of each of the plurality of second data signals to generate a plurality of third data signals, a plurality of adding units configured to add the additional signal to each of the plurality of third data signals to generate a plurality of fourth data signals, and a plurality of communication units configured to transmit the plurality of fourth data signals to the receiving apparatus.

A second aspect is the first aspect, in which the plurality of communication units are configured to transmit a training signal to the receiving apparatus, and receive, from the receiving apparatus, a signal including information indicating the communication path response estimated by the receiving apparatus using the transmitted training signal.

A third aspect is the second aspect, in which the receiving apparatus includes a communication unit configured to receive the fourth data signal and the training signal transmitted by the transmitting station, a removing unit configured to remove the additional signal added to the received fourth data signal, and an estimation unit configured to estimate, by using the received training signal, the communication path response between the transmitting station and the receiving apparatus.

A fourth aspect is a communication method for a radio communication system including a transmitting station and at least one receiving apparatus. The method includes modulating, by the transmitting station, a plurality of input data to generate first data signals in units of blocks having a predetermined data length, calculating, by the transmitting station, by using information acquired in advance and indicating a communication path response between the transmitting station and the receiving apparatus, information indicating directivity upon transmission of the first data signals generated by each of the plurality of modulation units, and predetermined information included in an additional signal to be added to a data signal, a delay wave component of the additional signal and subtracting, by the transmitting station, the delay wave component calculated, from each of the first data signals of the plurality of modulation units, to generate a plurality of second data signals, adjusting, by the transmitting station, by using the information indicating directivity, power and a phase upon transmission of each of the plurality of second data signals to generate a plurality of third data signals, adding, by the transmitting station, the additional signal to each of the plurality of third data signals to generate a plurality of fourth data signals, and transmitting, by the transmitting station, the plurality of fourth data signals to the receiving apparatus.

A fifth aspect is the fourth aspect further including, by the transmitting station, transmitting a training signal to the receiving apparatus, and receiving, from the receiving apparatus, a signal including information indicating the communication path response estimated by the receiving apparatus using the transmitted training signal.

A sixth aspect is a transmitting station apparatus provided in a base station and performing radio communication with at least one receiving apparatus, and the transmitting station apparatus includes a plurality of modulation units configured to modulate a plurality of input data to generate first data signals in units of blocks having a predetermined data length, a subtraction unit configured to calculate, by using information acquired in advance and indicating a communication path response between the transmitting station and the receiving apparatus, information indicating directivity upon transmission of the first data signals generated by each of the plurality of modulation units, and predetermined information included in an additional signal to be added to a data signal, a delay wave component of the additional signal and subtract the delay wave component calculated, from each of the first data signals of the plurality of modulation units, to generate a plurality of second data signals, a beam forming unit configured to adjust, by using the information indicating directivity, power and a phase upon transmission of each of the plurality of second data signals to generate a plurality of third data signals, a plurality of adding units configured to add the additional signal to each of the plurality of third data signals to generate a plurality of fourth data signals, and a plurality of communication units configured to transmit, to the receiving apparatus, the fourth data signals generated by each of the plurality of adding units.

A seventh aspect is the sixth aspect, in which the plurality of communication units are configured to transmit a training signal to the receiving apparatus, and receive, from the receiving apparatus, a signal including information indicating the communication path response estimated by the receiving apparatus using the transmitted training signal.

Effects of the Invention

With the present disclosure, it is possible to avoid delays in processing in single carrier block multi-user MIMO transmission.

DESCRIPTION OF EMBODIMENTS

An embodiment will be described with reference to drawings below.

Figure 1:
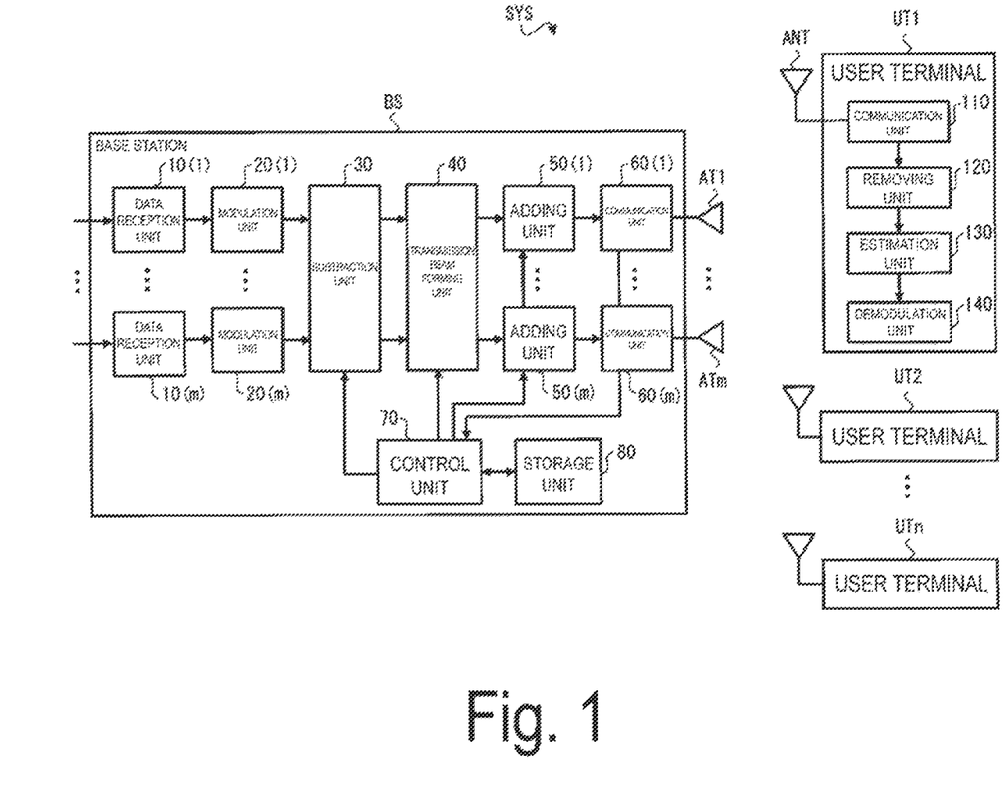
FIG. 1 is a diagram illustrating an embodiment of a radio communication system.

FIG. 1 is a diagram illustrating an embodiment of a radio communication system.

A radio communication system SYS illustrated in FIG. 1 includes a base station BS and n user terminals UT (UT1 to UTn). It is noted that there is n user terminals UT, but there may be at least one or more user terminals. The base station BS is an example of a transmitting station, and the user terminal UT is an example of a receiving apparatus.

The base station BS includes m data reception units 10 (10(1) to 10(*m*)), m modulation units 20 (20(1) to 20(*m*)), a subtraction unit 30, and a transmission beam forming unit 40. The base station BS also includes m adding units 50 (50(1) to 50(*m*)), m communication units 60 (60(1) to 60(*m*)), a control unit 70, a storage unit 80, and m antennas AT (AT1 to ATm). It is noted that the m data reception units 10, the m modulation units 20, the subtraction unit 30, the transmission beam forming unit 40, the m adding units 50, the m communication units 60, the control unit 70, the storage unit 80, and the m antennas AT may be packaged as a transmitting station apparatus.

The data reception unit 10 is a network interface or the like, for example, and is connected to a network via a wired or wireless connection. The data reception unit 10 receives data from a mobile communication terminal such as a smartphone, a computer device, or the like on the network, and outputs the received data to the modulation unit 20. It is noted that the data reception unit 10 may have an error correction coding function and an interleaving function for data to be transmitted to the user terminal UT. The data reception unit 10 may be connected, as an input/output interface, to a mobile communication terminal, a computer device, or the like via a wired or wireless connection.

The base station BS includes m data reception units 10, but may include one data reception unit 10 and a distributor, and the distributor may output data received by the one data reception unit 10 to each of the m modulation units 20.

The modulation unit 20 performs, based on, for example, the single carrier block multi-user MIMO communication scheme, modulation processing such as Quadrature Amplitude Modulation (QAM) on data received from each of the data reception units 10, and generates a data signal with a preset block length (symbol number).

Figure 2:
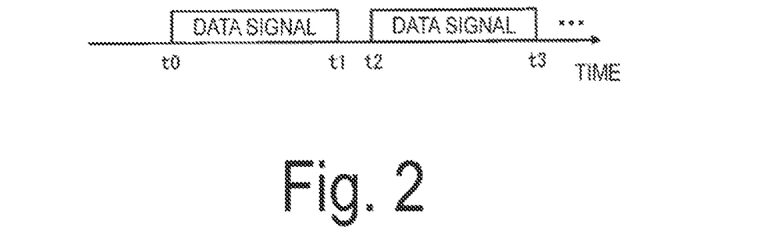
FIG. 2 is a diagram illustrating an example of a data signal generated by a modulation unit illustrated in FIG. 1.

FIG. 2 illustrates an example of a data signal generated by the modulation unit 20(1) illustrated in FIG. 1. A horizontal axis in FIG. 2 represents time. As illustrated in FIG. 2, the modulation unit 20(1) sequentially generates data signals with a set block length. Then, the modulation unit 20(1) outputs the generated data signals to the subtraction unit 30. It is noted that as with the modulation unit 20(1), each of the modulation units 20(2) to 20(*m*) also sequentially generates data signals. The data signal generated by modulation processing is an example of a first data signal.

The subtraction unit 30 calculates, by using Channel State Information (CSI) acquired in advance and indicating a communication path response between the base station BS and each of the user terminals UT, the weight of a transmission beam indicating directivity of the communication unit 60 and the antenna AT when transmitting the data signals, and predetermined data included in an additional signal added to the data signal instead of a conventional CP, a delay wave component of the additional signal for each of the modulation units 20. The subtraction unit 30 subtracts the calculated delay wave component from a data signal of each of the modulation units 20. It is noted that the predetermined data included in the additional signal is known data that is determined in advance, and is stored in the storage unit 80 such as a hard disk device. The CSI of each of the user terminals UT, the weight in transmission beam forming, the additional signal, and an operation of the subtraction unit 30 will be described in FIG. 4. The data signal to which subtraction processing has been performed is an example of a second data signal.

To avoid inter-block interference and inter-user interference when the data signals to which the subtraction processing has been performed are transmitted, the transmission beam forming unit 40 adjusts transmission power, a phase, and the like of each of the data signals to which the subtraction processing has been performed, based on the weight of a transmission beam. The transmission beam forming unit 40 outputs the adjusted data signals to each of the adding units 50. The data signal adjusted by the transmission beam forming unit 40 is an example of a third data signal.

The adding unit 50 adds an additional signal between blocks of the data signals whose transmission power, phase, and the like have been adjusted by the transmission beam forming unit 40, and outputs, to the communication unit 60, a data signal to which the additional signal has been added. The data signal to which the additional signal has been added is an example of a fourth data signal.

Figure 3:
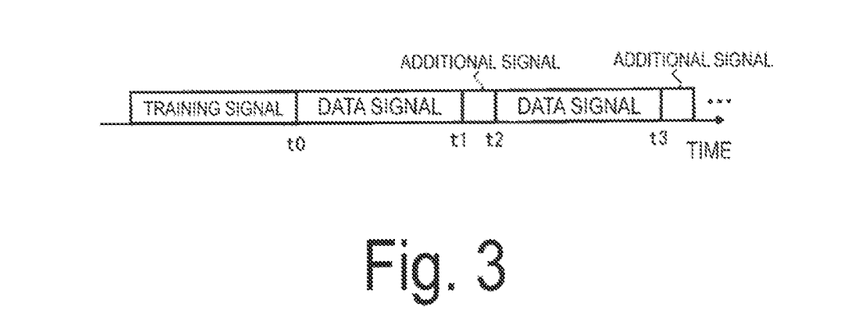
FIG. 3 is a diagram illustrating an example of addition processing in an adding unit illustrated in FIG. 1.

FIG. 3 illustrates an example of addition processing in the adding unit 50(1) illustrated in FIG. 1. A horizontal axis in FIG. 3 represents time. It is noted that a data signal illustrated in FIG. 3 is a signal obtained after the subtraction processing of the subtraction unit 30 and the adjustment processing of the transmission beam forming unit 40, on the data signal illustrated in FIG. 2.

As illustrated in FIG. 3, the adding unit 50(1) adds an additional signal between blocks of the data signals. It is noted that as with the adding unit 50(1), each of the adding units 50(2) to 50(m) also adds an additional signal between blocks of the data signals. In this way, the adding unit 50 adds an additional signal, which is known data not associated with the data signal, between the data signals, and thus, it possible to avoid 1-block long delay that occurs when a CP is added to the head of a data signal in conventional methods.

As illustrated in FIG. 3, the adding unit 50 adds a training signal generated by a training signal generation unit included in the base station BS to the head of an initial data signal, based on the single carrier block multi-user MIMO communication scheme. This allows the base station BS to monitor variation in the CSI between the base station BS and the user terminal UT that is estimated by the user terminal UT using the training signal added to the data signal even in a period, other than a training period, during which a data signal is transmitted, as a result of which communication quality between the base station BS and the user terminal UT can be kept constant.

Furthermore, the additional signal serves as a guard interval for inter-block interference, and thus, the number of symbols of data of the additional signal is preferably determined as appropriate in accordance with an influence of delay due to reflection, diffraction, or the like in the communication path between the base station BS and the user terminal UT, and required communication quality.

The communication unit 60 transmits a data signal to which an additional signal has been added to the user terminal UT via the antenna AT, for example. The communication unit 60 also receives a data signal transmitted from each of the user terminals UT, and performs demodulation processing on the received data signal, for example. The communication unit 60 outputs data included in the demodulated data signal to the control unit 70.

The control unit 70 is, for example, a processor or the like, and controls each of elements of the base station BS by executing a program stored in the storage unit 80 such as a hard disk device. For example, to acquire the CSI between the base station BS and the user terminal UT, the control unit 70 causes the training signal generation unit included in the base station BS to generate a training signal in the training period. The control unit 70 transmits the generated training signal to the user terminal UT via the communication unit 60 and the antenna AT, and receives, from the user terminal UT, a data signal including CSI estimated by the user terminal UT using the training signal. Then, the control unit 70 calculates the CSI between the base station BS and each of the user terminals UT in each of the data signal and the additional signal, based on the CSI between the base station BS and each of the user terminals UT in the training signal.

The control unit 70 stores, in the storage unit 80, the calculated CSI between the base station BS and each of the user terminals UT in the data signal and the additional signal.

The control unit 70 also calculates, by using the CSI received from each of the user terminals UT, the weight of the transmission beam, to avoid inter-block interference, inter-user interference, or the like when the data signals are transmitted. The control unit 70 stores the calculated weight of the transmission beam in the storage unit 80.

Then, the control unit 70 reads, from the storage unit 80, the CSI between the base station BS and each of the user terminals UT in the data signal and the additional signal, the weight of the transmission beam, and data of the additional signal, and outputs the same to the subtraction unit 30. The control unit 70 also outputs the read weight of the transmission beam to the transmission beam forming unit 40. The control unit 70 also outputs the read data of the additional signal to the adding unit 50.

It is noted that the control unit 70 uses the CSI received from each of the user terminals UT to calculate the CSI between the base station BS and each of the user terminals UT in the data signal and the additional signal, but the present disclosure is not limited thereto. For example, at the time of installation of the base station BS, a communication carrier may use a communication apparatus to measure communication environment at a position where the base station BS is installed, acquire CSI between the base station BS and each of the user terminals UT, and store the acquired CSI between the base station BS and each of the user terminals UT, in the storage unit 80.

The storage unit 80 is a memory, a hard disk device, or the like, and stores, together with a program executed by the control unit 70, the CSI of each of the user terminals UT in the data signal and the additional signal, the data of the additional signal, and the like.

The user terminal UT is a mobile communication terminal such as a smartphone or a tablet terminal, and transmits and receives data signals to and from the base station BS based on a communication scheme of the single carrier block multi-user MIMO transmission. The user terminal UT1 illustrated in FIG. 1 includes an antenna ANT, a communication unit 110, a removing unit 120, an estimation unit 130, and a demodulation unit 140. It is noted that user terminals UT2 to UTn include the same elements as those in the user terminal UT1. The user terminal UT may include a plurality of antennas ANT.

The communication unit 110 receives a data signal transmitted by the base station BS via the antenna ANT. The communication unit 110 also receives, from the base station BS, a training signal for estimating CSI between user terminal UT and the base station BS. The communication unit 110 down-converts received radio waves, and uses an AD converter or the like included in the communication unit 110 to convert the down-converted training signal and data signal into a digital signal. Then, based on a control instruction from a control unit such as a processor included in the user terminal UT, the communication unit 110 outputs the received data signal and training signal to the removing unit 120.

The communication unit 110 also transmits, to the base station BS, a data signal including CSI of the communication path between the user terminal UT and the base station BS estimated by the estimation unit 130, based on the communication scheme of the single carrier block multi-user MIMO transmission.

The removing unit 120 removes, in a chronological order, the additional signals added between blocks of the data signal received by the communication unit 110. Then, the removing unit 120 outputs, to the estimation unit 130, the data signal from which the additional signals have been removed. It is noted that in a case where the signal received by the communication unit 110 is a training signal, the removing unit 120 outputs the training signal to the estimation unit 130 without performing removing processing.

The estimation unit 130 estimates, by using a training signal included in signals received by the communication unit 110, a Channel Impulse Response (CIR) corresponding to a communication path between the user terminal UT and the base station BS. Then, the estimation unit 130 estimates, as a communication path response, CSI from the estimated CIR. The estimation unit 130 transmits a data signal including the estimated CSI to the base station BS via the communication unit 110 and the antenna ANT, based on the control instruction from the control unit of the user terminal UT, for example. It is noted that in a case where the signal received from the removing unit 120 is a data signal, the estimation unit 130 outputs the data signal to the demodulation unit 140 without performing estimation processing.

The demodulation unit 140 performs demodulation processing including equalization processing or the like on the data signal received from the estimation unit 130. Then, the user terminal UT outputs demodulated data to, for example, a display unit such as a Liquid Crystal Display (LCD) included in the user terminal UT, and displays the data on the display unit. The demodulation unit 140 may have an error correction decoding function or a deinterleaving function for data received from the base station BS.

Figure 4:
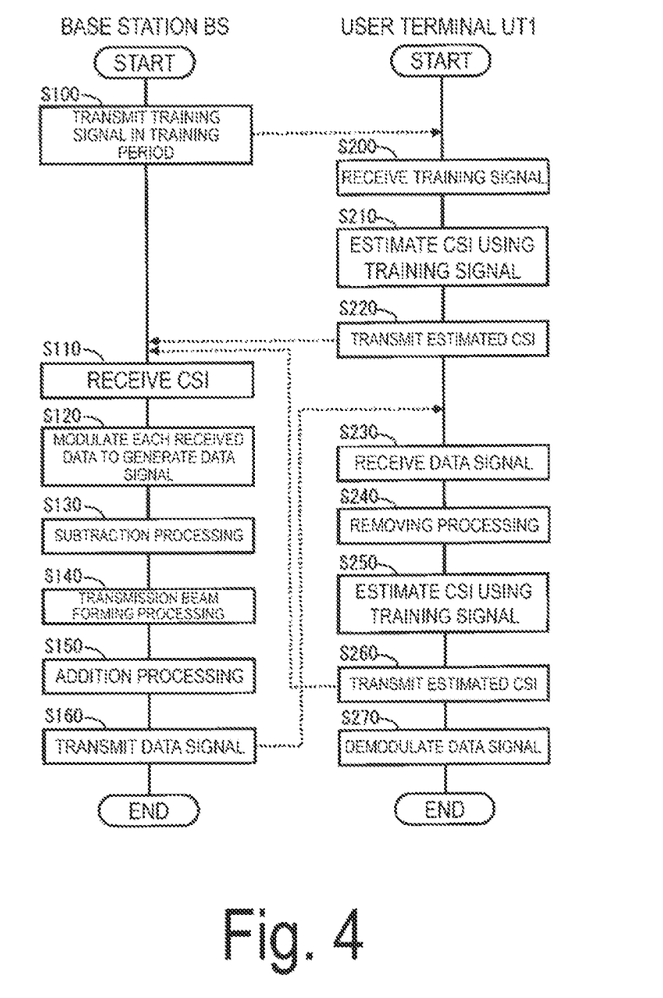
FIG. 4 is a diagram illustrating an example of communication processing in the radio communication system illustrated in FIG. 1.

FIG. 4 illustrates an example of communication processing in the radio communication system SYS illustrated in FIG. 1. It is noted that although the processing illustrated in FIG. 4 illustrates a case between the base station BS and the user terminal UT1, the same applies to processing between the base station BS and the user terminals UT2 to UTn.

In step S100, the control unit 70 causes the training signal generation unit in the base station BS to generate a training signal in a training period before a data signal is transmitted. Then, the control unit 70 transmits the generated training signal to the user terminal UT1 via the communication unit 60 and the antenna AT.

It is noted that the processing in step S100 may be performed at the time of installation of the base station BS, or may be performed every predetermined time interval such as one day or one month.

Next, in step S110, the communication unit 60 receives, from the user terminal UT1, a data signal including CSI between the base station BS and the user terminal UT1 estimated by the user terminal UT1 using the training signal. The control unit 70 also receives CSI between the base station BS and each of the user terminals UT2 to UTn from each of the user terminals UT2 to UTn, as in the case of the user terminal UT1. The control unit 70 uses the received CSI between the base station BS and each of the user terminals UT1 to UTn to calculate CSI for a data signal and an additional signal (hereinafter, also referred to as a "communication path response matrix") $H^{(D)}$ and $H^{(K)}$. The communication path response matrices $H^{(D)}$ and $H^{(K)}$ are expressed as Equation (1) and Equation (2).

[Math. 1]

$$H^{(D)} = \begin{bmatrix} H_{0,0}^{(D)} & \cdots & H_{0,m-1}^{(D)} \\ \vdots & \ddots & \vdots \\ H_{n-1,0}^{(D)} & \cdots & H_{n-1,m-1}^{(D)} \end{bmatrix} \quad (1)$$

$$H_{i,j}^{(D)} = \begin{bmatrix} h_{0,i,j} & 0 & \cdots & \cdots & 0 \\ h_{1,i,j} & h_{0,i,j} & 0 & \cdots & 0 \\ \vdots & \ddots & \ddots & \ddots & \vdots \\ 0 & 0 & \cdots & \cdots & h_{0,i,j} \end{bmatrix} \in \mathbb{C}^{N_D \times N_D}$$

[Math. 2]

$$H^{(K)} = \begin{bmatrix} H_{0,0}^{(K)} & \cdots & H_{0,m-1}^{(K)} \\ \vdots & \ddots & \vdots \\ H_{n-1,0}^{(K)} & \cdots & H_{n-1,m-1}^{(K)} \end{bmatrix} \quad (2)$$

$$H_{i,j}^{(K)} = \begin{bmatrix} 0 & \cdots & h_{2,i,j} & h_{1,i,j} \\ 0 & \cdots & 0 & h_{2,i,j} \\ \vdots & \ddots & \ddots & \vdots \\ 0 & 0 & \cdots & 0 \end{bmatrix} \in \mathbb{C}^{N_K \times N_K}$$

$N_D$ and $N_K$ represent the number of symbols of the data signal and the additional signal, and $N_D > N_K$. i is an integer from 1 to n representing each of the user terminals UT1 to UTn, and j is an integer from 1 to m representing each of the antennas AT1 to ATm. $h_{0,i,j}$ represents a component of the communication path response for a direct wave which is a radio wave of the data signal transmitted from the antenna ATj of the base station BS and directly received by the user terminal UTi. $h_{1,i,j}$ represents a component of the communication path response for a delay wave which is a radio wave of the data signal transmitted from the antenna ATj of the base station BS and received by the user terminal UTi after one reflection, diffraction, or the like. $h_{2,i,j}$ represents a component of the communication path response for a delay wave which is a radio wave of the data signal transmitted from the antenna ATj of the base station BS and received by the user terminal UTi after two reflections, diffractions, or the like.

The control unit 70 calculates a weight Q of a transmission beam, such that inter-block interference and inter-user interference can be avoided and a product $H^{(D)}Q$ of the communication path response matrix $H^{(D)}$ and the weight Q of the transmission beam is a block-diagonalized matrix. The control unit 70 stores the calculated communication path response matrices $H^{(D)}$ and $H^{(K)}$ and the weight Q in the storage unit 80. It is noted that the weight Q is a matrix of complex numbers of $N_D \cdot m \times N_D \cdot m$.

Next, in step S120, the modulation unit 20 performs, based on the single carrier block multi-user MIMO communication scheme, QAM modulation processing on data received from the data reception unit 10, and generates a data signal with $N_D$ symbols. The data signal having $N_D$ symbols generated in the modulation unit 20(j) is expressed as a vector having $N_D$ components, $s^{(D)}_{(j-1)}$. Data signals generated by all of the modulation units 20 are expressed as a vector $s^{(D)}$ having $N_D \cdot m$ components ($=(s^{(D)}_0, s^{(D)}_{m-1})$).

Next, in step S130, the control unit 70 reads the communication path response matrices $H^{(D)}$ and $H^{(K)}$, the weight Q of the transmission beam, and data of the additional signal from the storage unit 80, and outputs the read communication path response matrices $H^{(D)}$ and $H^{(K)}$, weight Q of the transmission beam, and data of the additional signal to the subtraction unit 30. The subtraction unit 30 calculates, by using the received communication path response matrices $H^{(D)}$ and $H^{(K)}$, weight Q of the transmission beam, and data of the additional signal, a delay wave component of the additional signal in a communication path between the base station BS and the user terminal UT for each of the modulation units 20.

For example, the data signal $s^{(D)}$ output from the modulation unit 20 is input to the subtraction unit 30, and a data signal output from the subtraction unit 30 is expressed as a vector $s^{(DK)}$ having $N_D \cdot m$ components $(=(s^{(DK)}_0, s^{(DK)}_{m-1}))$ The data signal $s^{(DK)}$ output from the subtraction unit 30 is input to the transmission beam forming unit 40, and a data signal output from the transmission beam forming unit 40 is expressed as a vector x(D) having $N_D \cdot m$ components $(=(x^{(D)}_0, x^{(D)}_{m-1}))$. It is noted that the data signal $s^{(DK)}_{(j-1)}$ and the data signal $x^{(D)}_{j-1}$ correspond to the data signal modulated by the modulation unit 20(j).

In a case where an additional signal added to the data signal $x^{(D)}_{(j-1)}$ by the adding unit 50(j) is expressed as a vector $x^{(K)}_{(j-1)}$ having $N_K$ components, an additional signal added to a data signal $x^{(D)}$ by all of the adding units 50 is expressed as a vector $x^{(K)}$ having $N_K \cdot m$ components $(=(x^{(K)}_0, \ldots, x^{(K)}_{m-1}))$. A data signal received by the user terminal UTi from the base station BS is expressed as a vector $y^{(D)}_{(i-1)}$, and data signals received by all of the user terminals UT are expressed as a vector $y^{(D)}$ $(=(y^{(D)}_0, y^{(D)}_{n-1})$. In this case, the received data signal $y^{(D)}$ is correlated with the communication path response matrices $H^{(D)}$ and $H^{(K)}$, the data signal $x^{(D)}$, and the additional signal $x^{(K)}$, as in Equation (3).

$$y^{(D)} = H^{(D)}x^{(D)} + H^{(K)}x^{(K)} + w \quad (3)$$

w represents a vector of Additive White Gaussian Noise (AWGN). The data signal $s^{(DK)}$ to which the subtraction processing has been performed by the subtraction unit 30 and the data signal $x^{(D)}$ output from the transmission beam forming unit 40 are correlated using the weight Q of the transmission beam as in Equation (4).

$$x^{(D)} = Qs^{(DK)} \quad (4)$$

Then, Equation (5) is obtained by performing substitution to Equation (3) by using Equation (4).

$$y^{(D)} = H(D)Qs^{(DK)} + H^{(K)}x^{(K)} + w \quad (5)$$

It is noted that removal of the component of the additional signal $x^{(K)}$ when the user terminal UT receives the data signal means that the received data signal $y^{(D)}$ becomes $H^{(D)}Qs^{(D)} + w$. That is, the data signal $s^{(DK)}$ to which the subtraction processing has been performed by the subtraction unit 30 is expressed as in Equation (6).

$$s^{(DK)} = s^{(D)} - (H^{(D)}Q)^\dagger H^{(K)}x^{(K)} \quad (6)$$

$(H^{(D)}Q)^\dagger$ represents a pseudo-inverse matrix of $H^{(D)}Q$. That is, the second term on the right side of Equation (6), $(H^{(D)}Q)^\dagger H^{(K)}x^{(K)}$ is a delay wave component of the additional signal calculated by the subtraction unit 30. Thus, the subtraction unit 30 calculates, by using the communication path response matrices $H^{(D)}$ and $H^{(K)}$, the weight Q of the transmission beam, and the data of the additional signal $x^{(K)}$, a delay wave component of the additional signal $x^{(K)}$ in the communication path between the base station BS and the user terminal UT, based on the formula $(H^{(D)}Q)^\dagger H^{(K)}x^{(K)}$. The subtraction unit 30 subtracts the calculated delay wave component from the data signal $s^{(D)}$ of the modulation unit 20 to generate the data signal $s^{(DK)}$. The subtraction unit 30 outputs the generated data signal $s^{(DK)}$ to the transmission beam forming unit 40.

Next, in step S140, the transmission beam forming unit 40 generates, by using the weight Q of the transmission beam and Equation (4), a data signal $x^{(D)}$ from the data signal $s^{(DK)}$ generated in step S130, to avoid inter-block interference and inter-user interference. The transmission beam forming unit 40 outputs the generated data signal $x^{(D)}$ to the adding unit 50.

Next, in step S150, the adding unit 50 adds an additional signal $x^{(K)}$ between blocks of the data signal $x^{(D)}$ generated in step S140. The adding unit 50 outputs, to the communication unit 60, the data signal $x^{(D)}$ to which the additional signal $x^{(K)}$ has been added.

Next, in step S160, the communication unit 60 transmits, to the user terminal UT via the antenna AT, the data signal $x^{(D)}$ to which the additional signal $x^{(K)}$ has been added in step S150.

Then, the base station BS repeatedly performs the processing from at least step S110 to step S160 each time the data reception unit 10 receives the data.

In step S200, the communication unit 110 receives, via the antenna ANT, a radio wave of the training signal transmitted in step S100. The communication unit 110 down-converts the received radio wave, and uses the AD converter or the like in the communication unit 110 to convert the down-converted training signal into a digital signal. Based on a control instruction from the control unit of the user terminal UT1, the communication unit 110 outputs the digital signal of the training signal to the estimation unit 130 via the removing unit 120.

Next, in step S210, the estimation unit 130 uses the training signal received in step S200 to estimate a CIR corresponding to the communication path between the user terminal UT and the base station BS. Then, the estimation unit 130 estimates, as a communication path response, CSI from the estimated CIR.

Next, in step S220, the estimation unit 130 transmits a data signal including the CSI estimated in step S210 to the base station BS via the communication unit 110 and the antenna ANT, based on the control instruction from the control unit of the user terminal UT1.

Next, in step S230, the communication unit 110 receives, via the antenna ANT, a radio wave of the data signal transmitted in step S160. The communication unit 110 down-converts the received radio wave, and uses the AD converter or the like in the communication unit 110 to perform conversion to a digital signal of the down-converted data signal $y^{(D)}$. Based on the control instruction from the control unit of the user terminal UT1, the communication unit 110 outputs the digital signal of the data signal $y^{(D)}$ to the removing unit 120.

Next, in step S240, the removing unit 120 removes, in a chronological order, the additional signal $x^{(K)}$ from the data signal $y^{(D)}$ received in step S230.

It is noted that in a case where the received data signal $y^{(D)}$ is not subjected to the subtraction processing in step S130 as in the conventional art, a delay wave component of the additional signal $x^{(K)}$ overlaps the data signal $x^{(D)}$ in a period of time during which the additional signal $x^{(K)}$ is not received, due to delay due to reflection, diffraction, or the like in the communication path. For this reason, the conventional art requires a configuration for removing the delay wave component of the additional signal $x^{(K)}$ overlapped on the data signal $x^{(D)}$ from the data signal $y^{(D)}$ received on the user terminal side. On the other hand, in the data signal $y^{(D)}$ to which the subtraction processing is performed in step S130, the delay wave component of the additional signal $x^{(K)}$ overlapped on the data signal $x^{(D)}$ is canceled out. Thus, a configuration for removing the delay wave component of the additional signal $x^{(K)}$ overlapped on the data signal $x^{(D)}$ from the data signal $y^{(D)}$ received at the user terminal UT1 is unnecessary.

Then, based on the control instruction from the control unit of the user terminal UT1, the removing unit 120 outputs, to the estimation unit 130, the data signal $y^{(D)}$ from which the additional signal $x^{(K)}$ between blocks of the data signal $x^{(D)}$ has been removed.

Next, in step S250, the estimation unit 130 estimates a CIR corresponding to the communication path between the user terminal UT1 and the base station BS by using a training signal added to the head, as illustrated in FIG. 3, of the data signal $y^{(D)}$ from which the additional signal $x^{(K)}$ has been removed in step S240. Then, the estimation unit 130 estimates, as a communication path response, CSI from the estimated CIR.

Next, in step S260, the estimation unit 130 transmits a data signal including the CSI estimated in step S250 to the base station BS via the communication unit 110 and the antenna ANT, based on the control instruction from the control unit of the user terminal UT1.

Next, in step S270, the demodulation unit 140 performs demodulation processing including equalization processing or the like on the data signal $y^{(D)}$ from which the additional signal $x^{(K)}$ has been removed in step S240. The user terminal UT1 outputs demodulated data to, for example, the display unit of the user terminal UT1, and displays the data on the display unit.

Then, the user terminal UT1 repeatedly performs the processing from step S200 to step S270 each time the user terminal UT1 receives a radio wave including a training signal or a data signal from the base station BS.

In the embodiment illustrated in FIGS. 1 to 4, in the single carrier block multi-user MIMO transmission, the base station BS adds, between blocks of a data signal, an additional signal including predetermined data acquired in advance instead of a conventional CP. That is, the base station BS adds additional signals, which are known data, between the data signals, and thus, the radio communication system SYS can avoid delays in processing in the single carrier block multi-user MIMO transmission.

Furthermore, the base station BS calculates, by using the communication path response matrices $H^{(D)}$ and $H^{(K)}$, the weight Q of the transmission beam, and the data of the additional signal, a delay wave component of the additional signal in the communication path between the base station BS and the user terminal UT for each of the modulation units 20. Then, the base station BS subtracts the calculated delay wave component from the data signal, adds an additional signal to the data signal to which the subtraction processing has been performed, and transmits the same. In this way, in the data signal received by the user terminal UT, the delay wave component of the additional signal overlapped on the data signal is canceled out. Thus, the user terminal UT does not need a configuration for removing the delay wave component of the additional signal overlapped on the received data signal, and it is possible to accurately demodulate data included in the data signal with a simple configuration.

The features and advantages of the embodiment will be apparent from the detailed description above. The claims are intended to cover the features and advantages of the embodiments as described above to the extent that the claims do not depart from its spirit and scope. Furthermore, it is believed that a person ordinarily skilled in the art readily can make any modifications and changes. Thus, the scope of the inventive embodiment is not intended to be limited to those described above, and it is also possible to rely on the appropriate modifications and equivalents falling within the scope disclosed in the embodiments.

REFERENCE SIGNS LIST

10 . . . Data reception unit
20(1) to 20(m) . . . Modulation unit
30 . . . Subtraction unit
40 . . . Transmission beam forming unit
50(1) to 50(m) . . . Adding unit
60(1) to 60(m), 110 . . . Communication unit
70 . . . Control unit
80 . . . Storage unit
120 . . . Removing unit
130 . . . Estimation unit
140 . . . Demodulation unit
AT1 to ATm, ANT . . . Antenna
BS . . . Base station
SYS . . . Radio communication system
UT1 to UTn . . . User terminal

The invention claimed is:

1. A radio communication system, comprising:
a transmitting station; and
at least one receiving apparatus,
wherein the transmitting station comprises
a plurality of modulation units configured to modulate a plurality of input data to generate first data signals in units of blocks having a predetermined data length,
a processor; and
a non-transitory storage medium having computer program instructions stored thereon, when executed by the processor, perform to:
calculate, by using information acquired in advance and indicating a communication path response between the transmitting station and the receiving apparatus, information indicating directivity upon transmission of the first data signals generated by each of the plurality of modulation units, and predetermined information included in an additional signal to be added to a data signal, a delay wave component of the additional signal and subtract the delay wave component calculated, from each of the first data signals of the plurality of modulation units, to generate a plurality of second data signals,
adjust, by using the information indicating directivity, power and a phase upon transmission of each of the plurality of second data signals to generate a plurality of third data signals,
add the additional signal to each of the plurality of third data signals to generate a plurality of fourth data signals, and
transmit the plurality of fourth data signals to the receiving apparatus.

2. The radio communication system according to claim 1, wherein the computer program instructions further perform to transmit a training signal to the receiving apparatus, and receive, from the receiving apparatus, a signal including information indicating the communication path response estimated by the receiving apparatus using the transmitted training signal.

3. The radio communication system according to claim 2, wherein the receiving apparatus comprises
a processor; and
a non-transitory storage medium having computer program instructions stored thereon, when executed by the processor, perform to:
receive the fourth data signal and the training signal transmitted by the transmitting station,
remove the additional signal added to the received fourth data signal, and
estimate, by using the received training signal, the communication path response between the transmitting station and the receiving apparatus.

4. A communication method for a radio communication system comprising a transmitting station and at least one receiving apparatus, the method comprising:
modulating, by the transmitting station, a plurality of input data to generate first data signals in units of blocks having a predetermined data length;
calculating, by the transmitting station, by using information acquired in advance and indicating a communication path response between the transmitting station and the receiving apparatus, information indicating directivity upon transmission of the first data signals generated by each of a plurality of modulation units, and predetermined information included in an additional signal to be added to a data signal, a delay wave component of the additional signal and subtracting, by the transmitting station, the delay wave component calculated, from each of the first data signals of the plurality of modulation units, to generate a plurality of second data signals;
adjusting, by the transmitting station, by using the information indicating directivity, power and a phase upon transmission of each of the plurality of second data signals to generate a plurality of third data signals;
adding, by the transmitting station, the additional signal to each of the plurality of third data signals to generate a plurality of fourth data signals; and
transmitting, by the transmitting station, the plurality of fourth data signals to the receiving apparatus.

5. The communication method according to claim 4, further comprising, by the transmitting station, transmitting a training signal to the receiving apparatus, and receiving, from the receiving apparatus, a signal including information indicating the communication path response estimated by the receiving apparatus using the transmitted training signal.

6. A transmitting station apparatus provided in a base station and performing radio communication with at least one receiving apparatus, the transmitting station apparatus comprising:
a plurality of modulation units configured to modulate a plurality of input data to generate first data signals in units of blocks having a predetermined data length;
a processor; and
a non-transitory storage medium having computer program instructions stored thereon, when executed by the processor, perform to:
calculate, by using information acquired in advance and indicating a communication path response between the transmitting station and the receiving apparatus, information indicating directivity upon transmission of the first data signals generated by each of the plurality of modulation units, and predetermined information included in an additional signal to be added to a data signal, a delay wave component of the additional signal and subtract the delay wave component calculated, from each of the first data signals of the plurality of modulation units, to generate a plurality of second data signals;
adjust, by using the information indicating directivity, power and a phase upon transmission of each of the plurality of second data signals to generate a plurality of third data signals;
add the additional signal to each of the plurality of third data signals to generate a plurality of fourth data signals; and
transmit, to the receiving apparatus, the fourth data signals generated by each of the plurality of adding units.

7. The transmitting station apparatus according to claim 6, wherein the computer program instructions further perform to transmit a training signal to the receiving apparatus, and receive, from the receiving apparatus, a signal including information indicating the communication path response estimated by the receiving apparatus using the transmitted training signal.

* * * * *